US012743384B1

(12) United States Patent
Kumar et al.

(10) Patent No.: US 12,743,384 B1
(45) Date of Patent: Sep. 22, 2026

(54) DYNAMIC SPACE ALLOCATION FOR CRYPTOGRAPHIC KEY MANAGEMENT

(71) Applicant: Bank of America Corporation, Charlotte, NC (US)

(72) Inventors: Saurabh Kumar, Gurugram (IN); Yedluri Praveen Chakravarthy, Hyderabad (IN); Vittal Surya Narayana Goli, Hyderabad (IN); Vishal Gupta, Hyderabad (IN); Ashisa Kumar Nayak, Hyderabad (IN); Swati Pandey, Hyderabad (IN); Raja Boyina, Pennington, NJ (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 19/008,729

(22) Filed: Jan. 3, 2025

(51) Int. Cl.
*G06F 12/14* (2006.01)
*G06F 21/60* (2013.01)

(52) U.S. Cl.
CPC ........ *G06F 12/1466* (2013.01); *G06F 21/602* (2013.01)

(58) Field of Classification Search
CPC .... G06F 3/604; G06F 12/1466; G06F 21/602; G06F 2212/1052; H04L 9/14; H04L 9/3234
See application file for complete search history.

(56) References Cited

U.S. PATENT DOCUMENTS

| | | | | |
|---|---|---|---|---|
| 10,467,422 | B1 * | 11/2019 | Roth | G06F 21/602 |
| 2003/0182566 | A1 * | 9/2003 | Kohara | H04L 9/0894 713/193 |
| 2007/0192597 | A1 * | 8/2007 | Bade | G06F 21/57 713/167 |
| 2019/0158281 | A1 * | 5/2019 | Han | H04L 9/0836 |
| 2019/0394035 | A1 * | 12/2019 | Jaquette | H04L 9/0891 |
| 2023/0168825 | A1 * | 6/2023 | Agrawal | G06F 21/64 711/163 |

* cited by examiner

*Primary Examiner* — Gary W. Cygiel
(74) *Attorney, Agent, or Firm* — Weiss & Arons LLP

(57) ABSTRACT

Systems, methods, and apparatus are provided for dynamic allocation of HSM disk space. A request to generate a data encryption key may be received and a set of logical HSM partitions scanned. When partition space is available for three keys, a set of three key versions may be generated. A first key state may be set to active and second and third key states may be set to pre-active. When no partition includes space for three keys, a new partition at the HSM may be initiated. When space is not available for a new partition at the HSM, a new partition at another HSM may be initiated. At a key rotation, partition metadata may be scanned to identify a key version in a pre-active state. The pre-active key version may be deleted, and a new active key version may be generated and stored in its place.

20 Claims, 5 Drawing Sheets

DYNAMIC SPACE ALLOCATION FOR CRYPTOGRAPHIC KEY MANAGEMENT

FIELD OF TECHNOLOGY

Aspects of the disclosure relate to hardware-based encryption.

BACKGROUND OF THE DISCLOSURE

A hardware security module (HSM) is a specialized computing device that may generate and store cryptographic keys while making them available for authorized users. An HSM may also securely perform hardware-based cryptographic operations. Illustrative cryptographic operations may include encryption, decryption, authentication, key management, and key exchange.

The HSM may be a standalone hardware device that is network-connected but separate from other parts of an entity system. For example, the HSM may be a plug-in card or an external device that attaches to a computer or network server. An HSM may also include tamper-resistant logs that record cryptographic operations along with the authorizing party. In some cases, a cloud-based HSM service may perform the same functions as the physical device.

An HSM may include logical partitions. A partition may function as an independent HSM and may provide a secure area for storing sensitive data. Each partition may include its own data, access controls, security policies, and separate administration access. An HSM may implement a form of firewall between partitions.

It would be desirable to dynamically allocate space at the time a key is created to ensure that a single partition will be able to accommodate an entire key lifecycle.

SUMMARY OF THE DISCLOSURE

Systems, methods, and apparatus are provided for dynamic allocation of disk space at an HSM.

A request may be received from an application to generate a data encryption key. The application may be authorized for hardware-based encryption at an HSM.

A set of logical HSM partitions may be scanned. The set of partitions may be controlled by an entity associated with the application. When a partition in the set of logical partitions includes disk space for three keys, a set of three key versions may be generated.

Metadata for each key version may include a key identifier, a version number, a date of creation, a date of expiration, HSM partition data, and a key state. Illustrative key states may include pre-active, active, deactivated, locked, and deleted. The key state for the first key version in the set of three key versions may be set to active. The key state for the second and third key versions in the set of key versions may be set to pre-active.

When no partition in the set of logical partitions includes space for three keys, a new logical partition at the HSM may be initiated and associated with the entity. When no space for a new logical partition is available at the HSM, a new logical partition at another HSM may be initiated and associated with the entity. When another HSM is not available, the request to generate a data encryption key may be terminated.

At a first key rotation, partition metadata may be scanned to locate a key version in a pre-active state. Metadata for the second key version may be updated from a pre-active state to a deleted state and the second key version may be deleted at the HSM. The HSM may generate a fourth key version and store the fourth key version in partition space previously filled by the second key version. Metadata for the fourth key version may include a key state set to active. Metadata for the first key version may be updated from the active state to a deactivated state.

At a second key rotation, partition metadata may be scanned to locate another key version in a pre-active state. Metadata for the third key version may be updated from a pre-active state to a deleted state and the third key version may be deleted at the HSM. The HSM may generate a fifth key version and store the fifth key version in partition space previously filled by the third key version. Metadata for the fifth key version may include a key state set to active. Metadata for the fourth key version may be updated from the active state to a deactivated state. Metadata for the first key version may be updated from a deactivated state to a locked state.

At subsequent key rotations, in response to a failure to locate a key version in a pre-active state, partition metadata may be scanned to locate a key version in a locked state.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
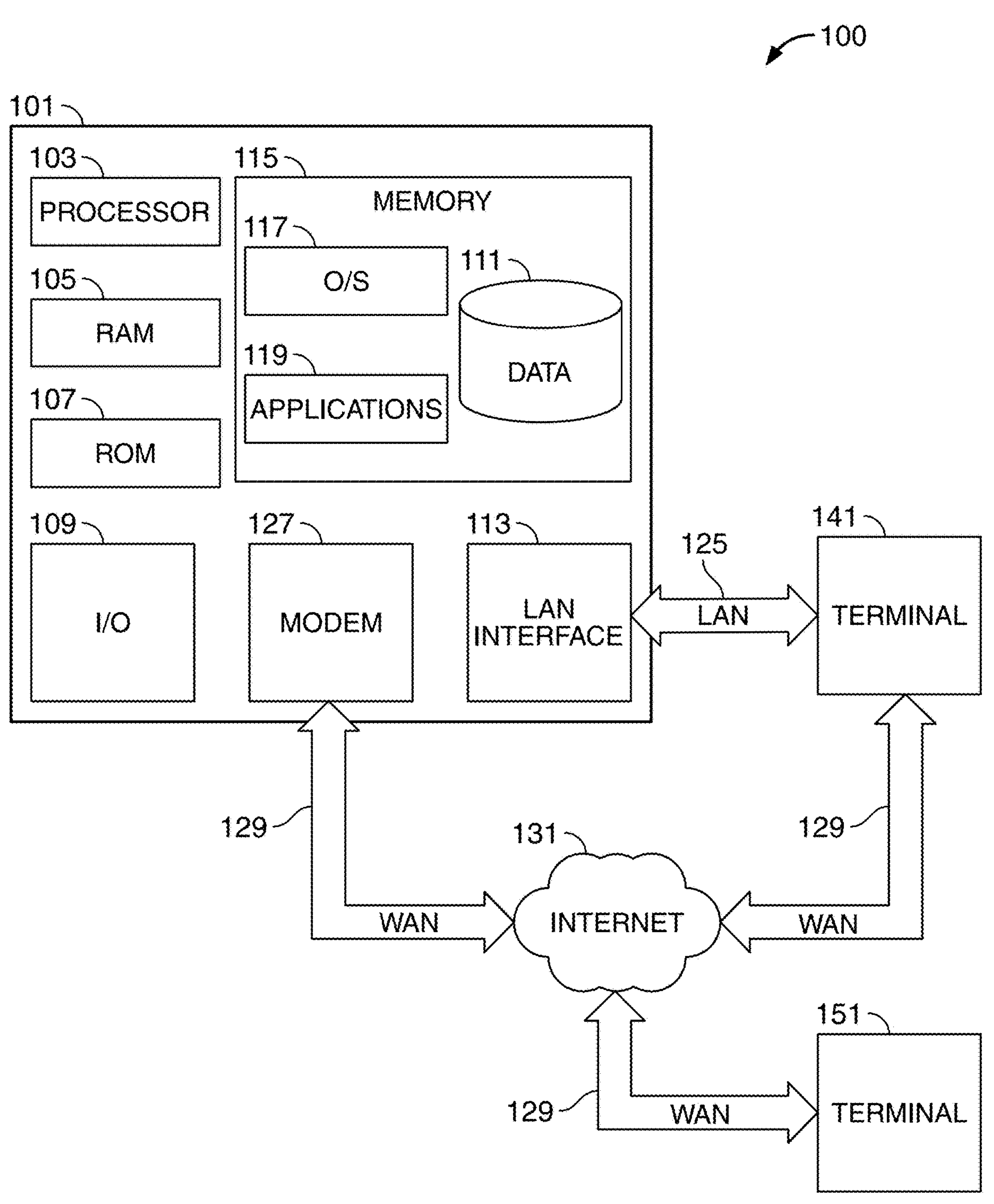
FIG. 1 shows illustrative apparatus in accordance with principles of the disclosure.

Systems, methods, and apparatus are provided for dynamic allocation of disk space at an HSM.

For the sake of illustration, the invention will be described as being performed by a "system." The system may include one or more features of apparatus and methods that are described herein and/or any other suitable device or approach.

The system may include an HSM. The HSM may generate and vault cryptographic keys, certificate strings, access passwords and any suitable secure material. The keys may be data encryption keys for hardware-based encryption. The HSM may perform cryptographic operations and maintain technical logs.

Keys vaulted in an HSM may be rotated on a periodic basis. The period between rotations may be determined based on sensitivity of the data, regulatory requirements, entity policy, or any suitable basis. Key rotation may include generating a new version of the data encryption key. A key may be generated with a key identifier. Each new version may include a new set of key material associated with the same key identifier.

A key version may be associated with a state. The state may indicate the current operational status of the key version. A key version may have different states over the course of its lifecycle. Illustrative states may include pre-active, active, deactivated, locked, and deleted. An active state may indicate that the version is currently in use for encryption and decryption. A deactivated state may indicate that the key is no longer being used for encryption but may still be used for decryption of existing data as needed. A locked key may be maintained pending deletion. A pre-active key may hold space in the HSM for an active key but may never see use.

An HSM partition may be limited by a finite amount of disk space. In conventional systems, a problem may arise when a version of a key is created without room to store subsequent versions. When the partition is full, key rotation may lead to an exception or force the system to create key versions in different partitions. Key versions in multiple partitions may raise maintenance and security challenges. Key versions in multiple partitions may also create complications in the event of key migration.

It would be desirable to pre-allocate disk space in an HSM partition so all the key versions aligned to a particular application may be maintained in a single partition. These protocols may improve security and management of data encryption keys over the course of the key lifecycle.

The system may include a database associated with the HSM. The HSM may generate and vault key versions. The database may store partition metadata. The database may store metadata associating a key identifier with a partition. The database may store metadata associated with the key versions for a key identifier.

The database may generate a record for each key version. Illustrative metadata associated with the database record may include a key identifier, version number, creation date, expiration date, key state, and HSM partition data. Database tables may maintain the relationship between key versions. The database may also maintain key usage data.

At the time of key rotation, a new record may be created in the database. The new record may include the same key identifier but a different version number. Key rotation may include calling the database to pull the key metadata information, such as the available versions and their states. Key rotation may include calling the database to pull partition metadata associated with the key location in the HSM. Key states for the existing key versions may be updated.

The system may generate a data encryption key at the HSM. An entity may maintain one or more partitions in the HSM. An application may be associated with the entity. The system may receive a request from the application. The system may determine that an application is authorized and authenticated. The system may determine that the application is configured for dynamic key encryption in which versions of the data encryption key are accessed through the HSM.

The system may compute the space required for the key lifecycle as part of the key generation process. The system may scan a first entity partition. The system may determine whether the partition has a threshold amount of disk space available. The threshold amount may be the space required to store three keys. If a first entity partition does not have enough space available, the system may continue to scan other entity partitions.

In some embodiments, if no partition has enough available space, the system may generate a new partition at the HSM. The new partition may be associated with the same entity and may be accessed via the same authentication protocols as the other entity partitions. In some embodiments, if the HSM does not have enough space to generate a new partition, the system may access another HSM. The entity may be a branch of a larger organization that maintains multiple HSMs.

In some embodiments, if no partitions have enough available space, the process may terminate. The entity may acquire additional partitions within the same HSM or may acquire space in a different HSM.

If a partition has enough available space, the HSM may create three key versions. One key version may be associated with an active state and may be used for encryption and decryption. The other two key versions may be associated with a pre-active state.

The key versions in the pre-active state may function as placeholders for future key versions. At a key rotation, a key version in the pre-active state may be deleted, and this space may be used to store a new version of the active key.

The system may rotate the keys on any suitable schedule. The schedule may be determined by a system administrator, an AI model, or any suitable party. The system may rotate the keys on a regular periodic basis. In some embodiments, the system may rotate the keys in response to a cybersecurity threat.

At a key rotation, the system may call key and partition metadata from the database using a max version function or any suitable algorithm. The system may set the max version to focus on a particular key or set of keys. Based on the key version and the partition metadata, the system may determine whether any key versions in a pre-active state are available. If a key version in a pre-active state is available, the system may call the pre-active key. The system may update the key state metadata in the database from pre-active directly to deleted. At the HSM the system may delete this key version.

If no key version in a pre-active state is available, the system may call a key version in a locked state. The system may update the key state metadata in the database from locked to deleted. At the HSM, the system may delete this key version.

At the HSM, the system may generate a new key version. The new key version may be associated with a key label and a key identifier. At the database, the system may create a new record for the new key version. The system may set the key state for the new key version to active in the database. The system may update the states of other existing versions of the key in the database. The system may update an active state to a deactivated state. The system may update a deactivated state to a locked state.

One or more non-transitory computer-readable media storing computer-executable instructions are provided. When executed by a processor on a computer system, the instructions may perform a method for dynamically allocating HSM disk space for a data encryption key lifecycle.

The method may include receiving a request from an application to generate a data encryption key. The method may include verifying that the application is configured for hardware-based dynamic key encryption at an HSM.

The method may include scanning a set of logical partitions at an HSM. The set of logical partitions may be associated with an entity responsible for administration of the set of partitions. The entity may control access and credentialing for the HSM partitions. When a partition in the set of logical partitions includes disk space for three keys, the method may include generating a set of three key versions at the HSM.

The method may include generating metadata for the set of key versions at a database associated with the HSM. Metadata for each key version may include a key identifier, a version number, a date of creation, a date of expiration, HSM partition data, a key state, and/or any suitable metadata. The metadata for the first key version in the set of key versions may include a key state set to active. The metadata for the second and third key versions may include a key state set to pre-active.

When no partition in the set of logical partitions includes space for three keys, the method may include initiating a new logical partition associated with the entity at the HSM. When a new logical partition is not available at the HSM, the method may include initiating a new logical partition at another HSM. When another HSM is not available, the method may include terminating the request to generate a data encryption key.

The method may include, at a first key rotation, scanning partition metadata to locate a key version in a pre-active state. Metadata for the second key version may be updated from a pre-active state to a deleted state and the HSM may delete the second key version. The method may include generating a fourth key version and storing the fourth key version in partition space previously filled by the second key version. Metadata for the fourth key version may include a key state set to active. Metadata for the first key version may be updated from an active state to a deactivated state.

The method may include, at a second key rotation, scanning partition metadata to locate a key version in a pre-active state. Metadata for the third key version may be updated from a pre-active state to a deleted state and the HSM may delete the third key version. The method may include generating a fifth key version and storing the fifth key version in partition space previously filled by the third key version. Metadata for the fifth key version may include a key state set to active. Metadata for the fourth key version may be updated from an active state to a deactivated state. Metadata for the first key version may be updated from a deactivated state to a locked state.

The method may include, at subsequent key rotations, in response to a failure to locate a key version in a pre-active state, scanning partition metadata to locate a key version in a locked state.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods. Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server," or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may include processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. Processor 103 may also execute all software running on the computer. Other components commonly used for computers, such as EEPROM or flash memory or any other suitable components, may also be part of computer 101.

Memory 115 may include any suitable permanent storage technology, such as a hard drive. Memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 may connect to LAN 125 through LAN interface 113 or an adapter. When used in a WAN networking environment, computer 101 may include modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
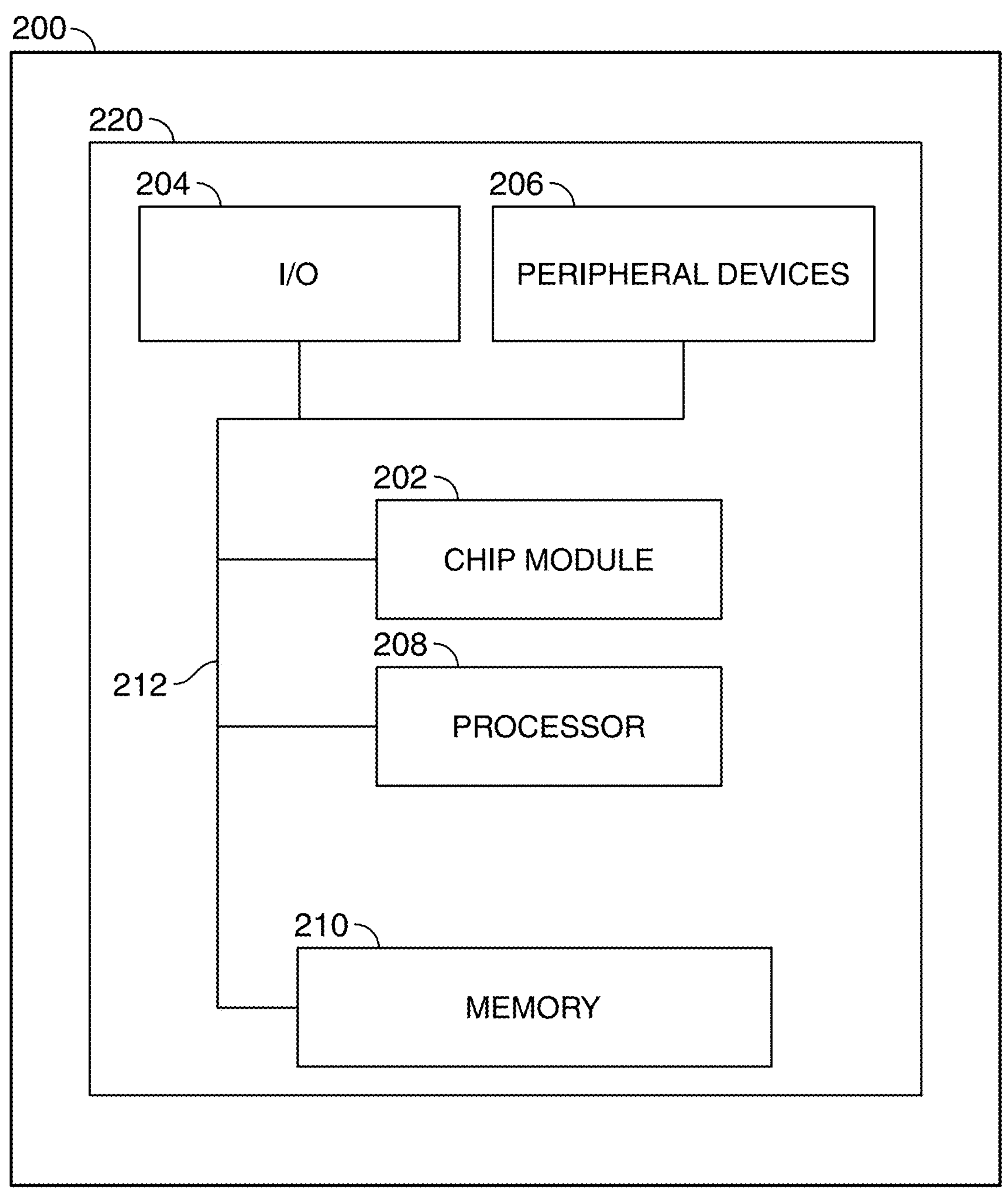
FIG. 2 shows illustrative apparatus in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data machine structures: executable instructions, (which may be alternatively referred to herein as "computer instructions" or "computer code"), applications such as applications 219, signals, and/or any other suitable information or data structures.

Components 202, 204, 206, 208, and 210 may be coupled together by a system bus or other interconnections 212 and may be present on one or more circuit boards such as circuit board 220. In some embodiments, the components may be integrated into a single chip. The chip may be silicon-based.

Figure 3:
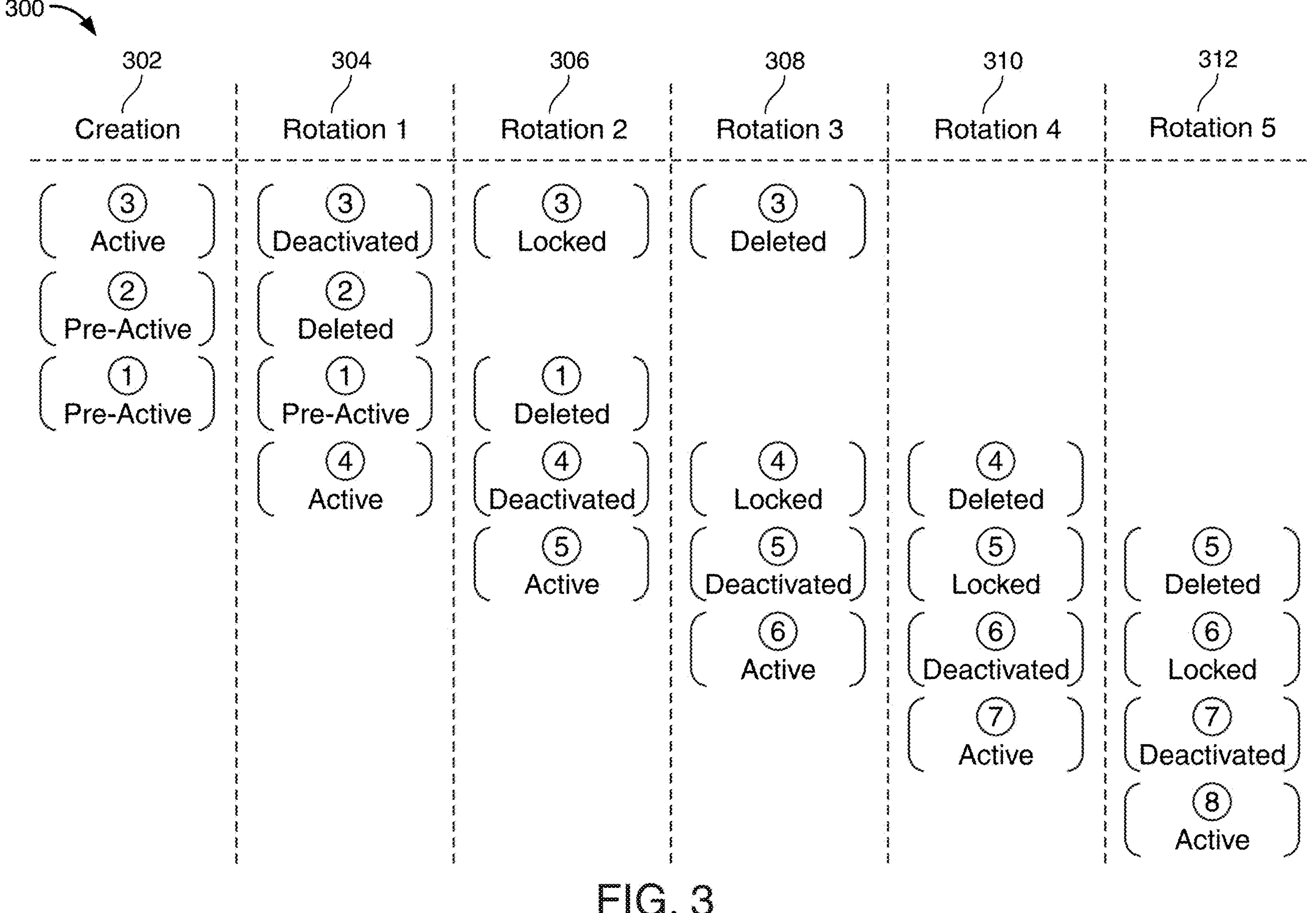
FIG. 3 shows an illustrative process flow in accordance with principles of the disclosure.

FIG. 3 shows illustrative process flow 300 for dynamic allocation of disk space at an HSM.

Column 302 shows generation of a cryptographic key. In order to generate a key, the system may scan partitions to locate available space for a set of three key versions. Created key version 3 may be assigned an active state and versions 1 and 2 may be assigned a pre-active state. This protocol ensures that the partition will have space to accommodate an entire key lifecycle.

States for the key versions may be assigned by generating and updating metadata associated with each key version. The keys may be vaulted in an HSM. In some embodiments, metadata may be stored in an associated database.

Columns 304-312 show key rotations. Column 304 shows a first key rotation. At column 304, pre-active key version 2 may be deleted to create space for a new active key version 4. Active key version 3 may be assigned a deactivated state.

Column 306 shows a second key rotation. At column 306, pre-active key version 1 may be deleted to create space for a new active key version 5. Active key version 4 may be assigned a deactivated state. Deactivated key version 3 may be assigned a locked or pre-delete state.

Column 308 shows a third key rotation. At column 308, locked key version 3 may be deleted to create space for new active key version 6. Active key version 5 may be assigned a deactivated state. Deactivated key version 4 may be assigned a locked state.

Columns 310 and 312 show fourth and fifth key rotations. At columns 310-312 and in subsequent rotations, the original dynamic space allocation ensures that a locked key version may always be deleted to make room for a new key version and no versions need to be created outside the original partition.

Figure 4:
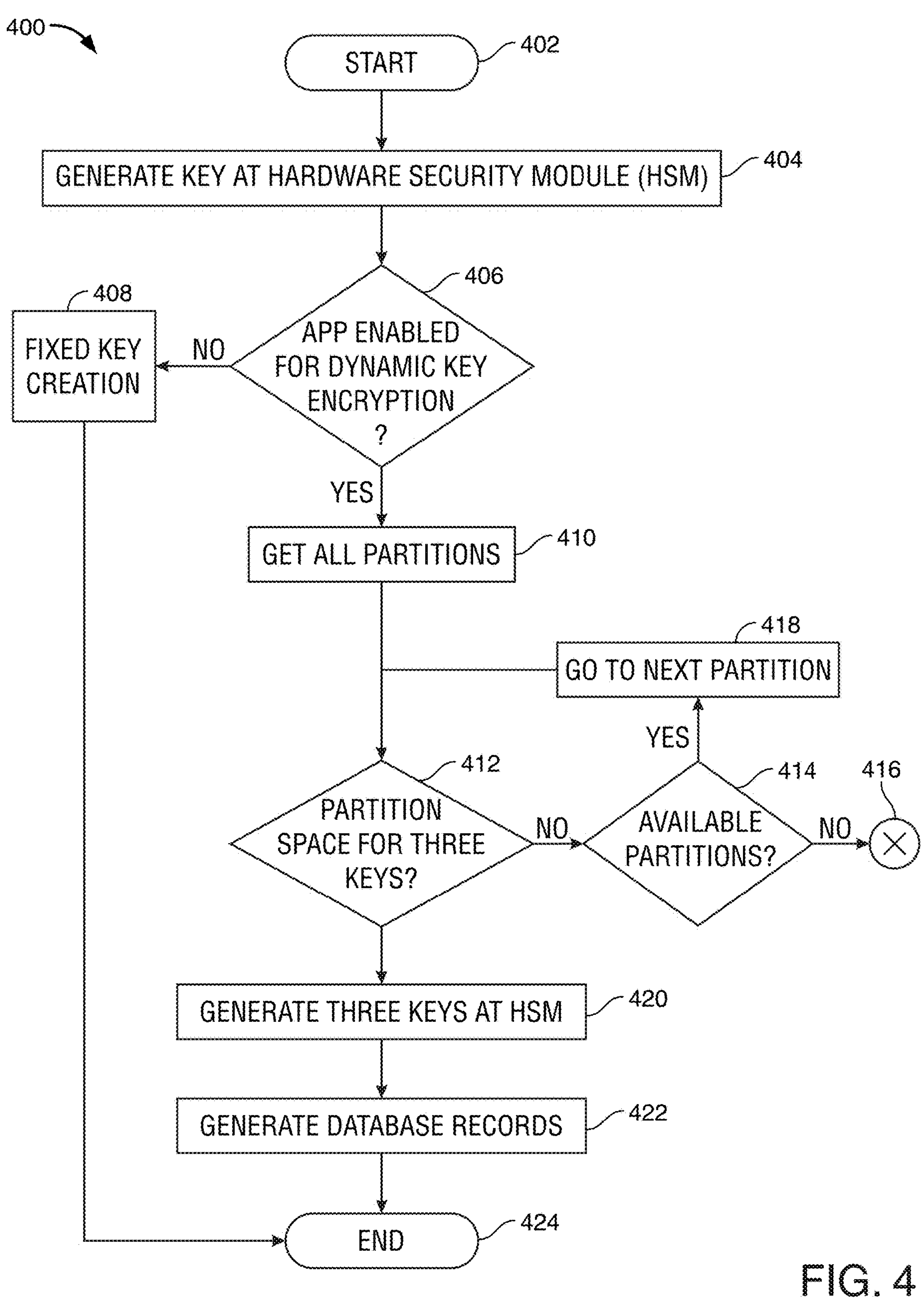
FIG. 4 shows an illustrative process flow in accordance with principles of the disclosure.

FIG. 4 shows illustrative process flow 400 for dynamic allocation of disk space at an HSM. At 402, the process begins. At 404, the system may authenticate an application and receive a request to generate a data encryption key at an HSM.

At 406, the system may determine whether the application is enabled for hardware-based dynamic key encryption, in which encryption operations are carried out by the HSM rather than at the application level. At 408, if the application is not enabled for dynamic key encryption, a fixed key may be created and transmitted to the application.

At 410, if the application is enabled for dynamic key encryption, the system may call partition data to scan for available space. At 412, the system may determine whether a partition has available space for three key versions.

At 414, if there is not enough available space in a partition, the system may determine if other partitions are available. The system may determine if another partition could be acquired, within the same HSM or at a different HSM. At 416, if no other partition space is available the process may terminate.

At 418, if other partitions are available, the system may scan the next partition for available space. At 412, the system may determine whether the next partition has available space for three key versions.

At 420, if there is enough available space in a partition, the system may generate three key versions at the HSM. At 422, the system may generate records for the key versions in a database associated with the HSM. The records may include metadata associated with a key identifier such as version number, creation date, expiration date, and state. At 424, the process may terminate.

Figure 5:
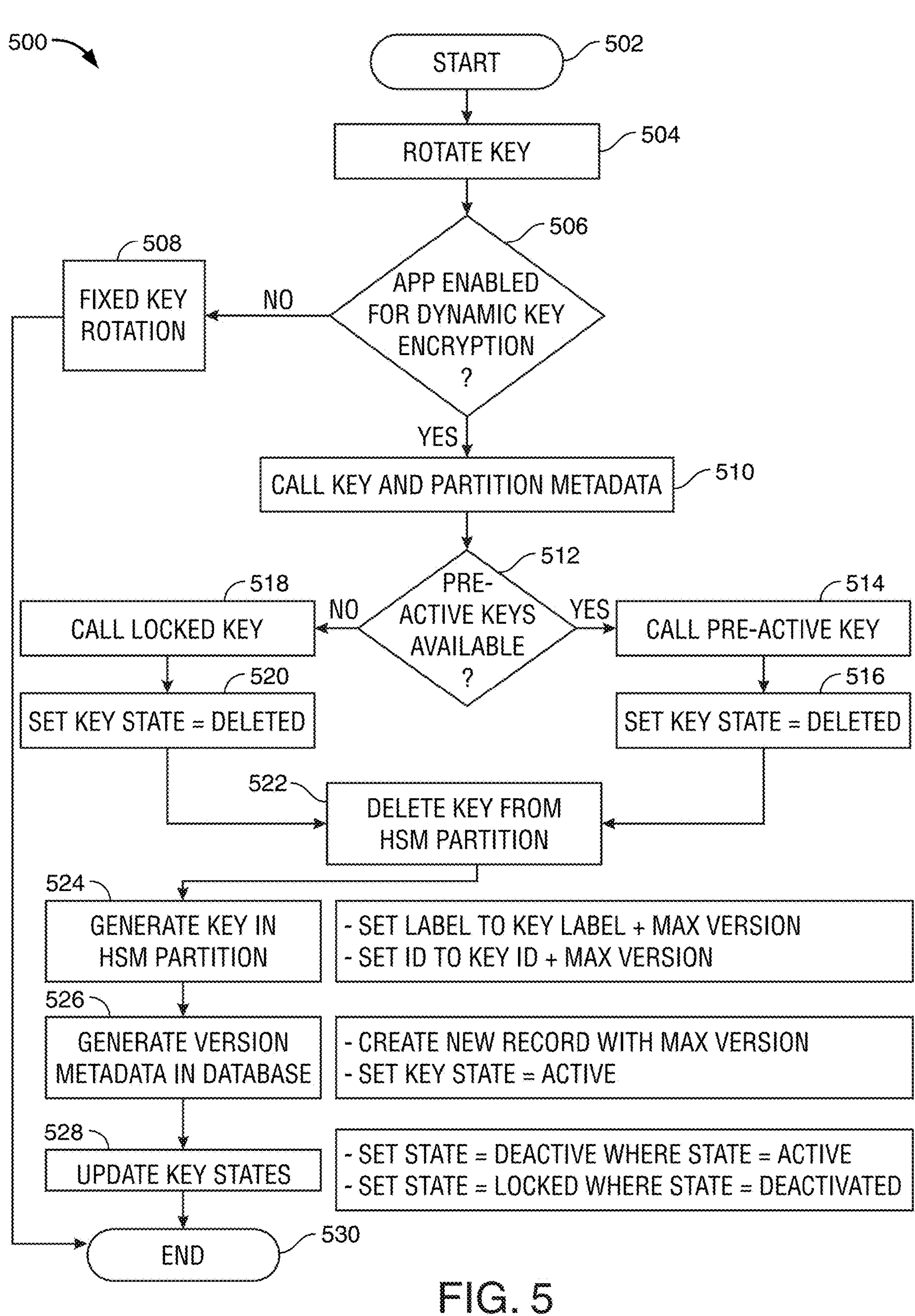
FIG. 5 shows an illustrative process flow in accordance with the principles of the disclosure.

FIG. 5 shows illustrative process flow 500 for key rotation based on dynamic allocation of disk space at an HSM. At 502, the process may begin. At 504, the system may authenticate an application and verify that an application has an active key. The system may begin the process of key rotation.

At 506, the system may determine whether the application is enabled for hardware-based dynamic key encryption, in which encryption operations are carried out by the HSM rather than at the application level. At 508, if the application is not enabled for dynamic key encryption, a new fixed key may be created and transmitted to the application.

At 510, if the application is enabled for dynamic key encryption, the system may call key and partition metadata from the database. At 512, the system may determine if any pre-active key versions are available. At 514, the system may call a pre-active key version. At 516, the system may update the key state from pre-active to deleted. At 522, the HSM may delete the key version.

At 518, if no pre-active key versions are available, the system may call a locked key version. At 520, the system may update the key state from locked to deleted. At 522, the HSM may delete the key version.

At 524, the system may generate a new active key version in the HSM to be stored in the space made available by the deleted version. In the database, a record may be generated for the key identifier. At 526, metadata associated with the version may be stored in the database. The metadata may include a key state. The key state for the new key version may be set be set to active.

At 528, the system may update the key states for other key versions associated with the same key identifier. The key state for an active version may be set to deactivated. The key state for a deactivated version may be set to locked. At 530, the process may terminate.

Thus, methods and apparatus for DYNAMIC SPACE ALLOCATION FOR CRYPTOGAPHIC KEY MANAGEMENT are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for dynamically allocating hardware security module (HSM) disk space for a data encryption key lifecycle, the method comprising:

receiving a request from an application to generate a data encryption key;

scanning a set of logical partitions at an HSM;

when a partition in the set of logical partitions comprises disk space for three keys:

generating a set of three key versions;

generating metadata for a first key version in the set of three key versions comprising an active state; and generating metadata for a second key version and a third key version in the set of three key versions comprising a pre-active state;

when no partition in the set of logical partitions comprises space for three keys, initiating a new logical partition at the HSM;

when no new logical partition is available at the HSM, initiating a new logical partition at another HSM; and when another HSM is not available, terminating generation of a data encryption key.

2. The method of claim 1, further comprising, at a key rotation:

scanning partition metadata to locate a key version in a pre-active state;

updating metadata for the second key version from the pre-active state to a deleted state and deleting the second key version;

generating a fourth key version and storing the fourth key version in a partition space previously filled by the second key version;

generating metadata for the fourth key version comprising an active state; and updating metadata for the first key version from the active state to a deactivated state.

3. The method of claim 2, wherein the key rotation is a first key rotation, the method further comprising, at a second key rotation:

scanning partition metadata to locate a key version in a pre-active state;

updating metadata for the third key version from the pre-active state to a deleted state and deleting the third key version;

generating a fifth key version and storing the fifth key version in a partition space previously filled by the third key version;

generating metadata for the fifth key version comprising an active state;

updating metadata for the fourth key version from the active state to a deactivated state; and updating metadata for the first key version from the deactivated state to a locked state.

4. The method of claim 2, further comprising, in response to a failure to locate a key version in a pre-active state, scanning partition metadata to locate a key version in a locked state.

5. The method of claim 1, further comprising verifying that the request is associated with an application configured for hardware-based dynamic key encryption at an HSM.

6. The method of claim 1, wherein metadata generated for each key version comprises a key identifier, a version number, a date of creation, a date of expiration, HSM partition data, and a key state.

7. The method of claim 6, wherein possible key states comprise pre-active, active, deactivated, locked, and deleted.

8. One or more non-transitory computer-readable media storing computer-executable instructions which, when executed by a processor on a computer system, perform a method for dynamically allocating hardware security module (HSM) disk space for a data encryption key lifecycle, the method comprising:

receiving a request from an application to generate a data encryption key;

scanning a set of logical partitions at an HSM;

when a partition in the set of logical partitions comprises disk space for three keys:

generating a set of three key versions;

generating metadata for a first key version in the set of three key versions comprising an active state; and generating metadata for a second key version and a third key version in the set of three key versions comprising a pre-active state;

when no partition in the set of logical partitions comprises space for three keys, initiating a new logical partition at the HSM;

when a new logical partition is not available at the HSM, initiating a new logical partition at another HSM; and when another HSM is not available, terminating generation of a data encryption key.

9. The media of claim 8, further comprising, at a key rotation:

scanning partition metadata to locate a key version in a pre-active state;

updating metadata for the second key version from the pre-active state to a deleted state and deleting the second key version;

generating a fourth key version and storing the fourth key version in a partition space previously filled by the second key version;

generating metadata for the fourth key version comprising an active state; and updating metadata for the first key version from the active state to a deactivated state.

10. The media of claim 9, wherein the key rotation is a first key rotation, the method further comprising, at a second key rotation:

scanning key metadata to locate a key version in a pre-active state;

updating metadata for the third key version from the pre-active state to a deleted state and deleting the third key version;

generating a fifth key version and storing the fifth key version in a partition space previously filled by the third key version;

generating metadata for the fifth key version comprising an active state;

updating metadata for the fourth key version from the active state to a deactivated state; and updating metadata for the first key version from the deactivated state to a locked state.

11. The media of claim 9, the method further comprising, in response to a failure to locate a key version in a pre-active state, scanning partition metadata to locate a key version in a locked state.

12. The media of claim 8, the method further comprising verifying that the request is associated with an application configured for hardware-based dynamic key encryption at an HSM.

13. The media of claim 8, wherein metadata generated for each key version comprises a key identifier, a version number, a date of creation, a date of expiration, HSM partition data, and a key state.

14. A system for dynamically allocating hardware security module (HSM) disk space for a data encryption key lifecycle, the system comprising a processor configured to:

receive a request from an application to generate a data encryption key;

scan a set of logical partitions at an HSM;

when a partition in the set of logical partitions comprises disk space for three keys, generate a set of three key versions;

at a database associated with the HSM:

generate metadata for a first key version in the set of three key versions comprising an active state; and generate metadata for a second key version and a third key version in the set of three key versions comprising a pre-active state;

when no partition in the set of logical partitions comprises space for three keys, initiate a new logical partition at the HSM;

when a new logical partition is not available at the HSM, initiate a new logical partition at another HSM; and when another HSM is not available, terminate the request to generate a data encryption key.

15. The system of claim 14, the processor further configured to, at a key rotation:

scan partition metadata to locate a key version in a pre-active state;

update metadata for the second key version from the pre-active state to a deleted state and deleting the second key version;

generate a fourth key version and store the fourth key version in a partition space previously filled by the second key version;

generate metadata for the fourth key version comprising an active state; and update metadata for the first key version from the active state to a deactivated state.

16. The system of claim 15, wherein the key rotation is a first key rotation, the processor further configured to, at a second key rotation:

scan partition metadata to locate a key version in a pre-active state;

update metadata for the third key version from the pre-active state to a deleted state and deleting the third key version;

generate a fifth key version and store the fifth key version in a partition space previously filled by the third key version;

generate metadata for the fifth key version comprising an active state;

update metadata for the fourth key version from the active state to a deactivated state; and update metadata for the first key version from the deactivated state to a locked state.

17. The system of claim 15, the processor further configured to, in response to a failure to locate a key version in a pre-active state, scan partition metadata to locate a key version in a locked state.

18. A method for dynamically allocating hardware security module (HSM) disk space for a data encryption key lifecycle, the method comprising:

scanning a plurality of logical partitions at an HSM;

when a partition in the plurality of logical partitions comprises disk space for three keys, generating a set of three key versions;

generating metadata for a first key version in the set of three key versions comprising an active state; and generating metadata for a second key version and a third key version in the set of three key versions comprising a pre-active state;

at a first key rotation:

scanning partition metadata to locate a key version in a pre-active state;

updating metadata for the second key version from the pre-active state to a deleted state and deleting the second key version;

generating a fourth key version and storing the fourth key version in a partition space previously used by the second key version;

generating metadata for the fourth key version comprising an active state; and updating metadata for the first key version from the active state to a deactivated state; and at a second key rotation:

scanning key metadata to locate a key version in a pre-active state;

updating the metadata for the third key version from the pre-active state to a deleted state and deleting the third key version;

generating a fifth key version and storing the fifth key version in a partition space previously used by the third key version;

generating metadata for the fifth key version comprising an active state;

updating metadata for the fourth key version from the active state to a deactivated state; and updating metadata for the first key version from the deactivated state to a locked state.

19. The method of claim 18, further comprising, when no partition in the plurality of logical partitions comprises space for three keys:

initiating a new logical partition of HSM disk space;

generating a set of three key versions at the new partition;

generating metadata for a first key version in the set of three key versions comprising an active state; and generating metadata for a second key version and a third key version in the set of three key versions comprising a pre-active state.

20. The method of claim 18, wherein the HSM is a first HSM, the method further comprising, when no partition in the plurality of logical partitions comprises space for three keys and no new logical partitions may be initiated at the first HSM:

connecting to a second HSM comprising a plurality of logical partitions;

generating a set of three key versions at a partition at the second HSM;

generating metadata for a first key version in the set of three key versions comprising an active state; and generating metadata for a second key version and a third key version in the set of three key versions comprising a pre-active state.

* * * * *